US008358326B2

(12) United States Patent
Hanada

(10) Patent No.: US 8,358,326 B2
(45) Date of Patent: Jan. 22, 2013

(54) TWO-DIMENSIONAL LIGHT SCANNING APPARATUS

(75) Inventor: Yoshihiro Hanada, Kanagawa (JP)

(73) Assignee: Pioneer Corporation, Kanagawa (JP)

(*) Notice: Subject to any disclaimer, the term of this patent is extended or adjusted under 35 U.S.C. 154(b) by 0 days.

(21) Appl. No.: 13/395,012

(22) PCT Filed: Jan. 26, 2011

(86) PCT No.: PCT/JP2011/051496
§ 371 (c)(1),
(2), (4) Date: Mar. 8, 2012

(87) PCT Pub. No.: WO2012/101782
PCT Pub. Date: Aug. 2, 2012

(65) Prior Publication Data
US 2012/0224235 A1    Sep. 6, 2012

(51) Int. Cl.
*B41J 15/14* (2006.01)
*B41J 27/00* (2006.01)
*H04N 1/04* (2006.01)
(52) U.S. Cl. .......................... 347/243; 347/259; 358/474
(58) Field of Classification Search .................. 347/230, 347/241–244, 256–260; 358/474, 489
See application file for complete search history.

(56) References Cited

U.S. PATENT DOCUMENTS

| 6,714,331 | B2 | 3/2004 | Lewis et al. | |
| 6,843,568 | B2 * | 1/2005 | Schenk et al. | 353/46 |
| 7,847,997 | B2 * | 12/2010 | Sandner et al. | 359/239 |
| 7,972,014 | B2 * | 7/2011 | Hung et al. | 353/69 |
| 2002/0024708 | A1 | 2/2002 | Lewis et al. | |
| 2003/0179427 | A1 | 9/2003 | Lewis et al. | |

FOREIGN PATENT DOCUMENTS

| JP | 61-112120 | 5/1986 |
| JP | 2004-020873 | 1/2004 |
| JP | 2004-527793 | 9/2004 |
| JP | 2008-216299 | 9/2008 |
| JP | 2008216299 A * | 9/2008 |
| WO | WO 2006/082827 | 8/2006 |

OTHER PUBLICATIONS

International Search Report, PCT/2011/051496, Mar. 22, 2011.

* cited by examiner

*Primary Examiner* — Hai C Pham
(74) *Attorney, Agent, or Firm* — Young & Thompson

(57) ABSTRACT

A two-dimensional light scanning apparatus includes: a deflector to drive at a resonance frequency in a main scanning direction and a sub-scanning direction different from the main scanning direction; a position sensor to detect a scanning position of the deflector; a resonance frequency predicting part to predict the resonance frequency of the deflector; and a deflector drive control part to: for drawing a Lissajous figure in which scanning trajectories of the deflector do not overlap with each other for one frame, store a plurality of pairs of respective frequency ratios of driving signals in the sub-scanning direction to driving signals in the main scanning direction, and respective phases of the driving signals in the sub-scanning direction with respect to the driving signals in the main scanning direction; select one pair of a frequency ratio and a phase; and control the deflector with a driving signal.

4 Claims, 3 Drawing Sheets

| VERTICAL DRIVE FREQUENCY(Hz) | HORIZONTAL DRIVE FREQUENCY(Hz) | HORIZONTAL PERIODICITY :VERTICAL PERIODICITY |
|---|---|---|
| 600 | 2820 | 「47:10」 |
| | 2940 | 「49:10」 |
| | 3060 | 「51:10」 |
| | 3180 | 「53:10」 |
| 660 | 2880 | 「48:11」 |
| | 3000 | 「50:11」 |
| | 3120 | 「52:11」 |
| | 3240 | 「54:11」 |

51:10  φ=1/4 (rad)
(c)

TWO-DIMENSIONAL LIGHT SCANNING APPARATUS

TECHNICAL FIELD

The present invention relates to a two-dimensional light scanning apparatus used in, for example, a laser projector, an optical scanner and so forth.

BACKGROUND OF ART

Conventionally, a two-dimensional light scanning apparatus has been known, which has a MEMS (Micro Electro Mechanical System) mirror driving at a high speed while irradiated with laser light. In order to perform drawing with this two-dimensional light scanning apparatus, a MEMS mirror may drive at its resonance frequency in both vertical and horizontal directions for scanning as drawing Lissajous figures. In this case, drawing positions can be separated into horizontal positions X as horizontal components and vertical positions Y as vertical components. A horizontal position X is represented by the following equation 1, where the horizontal frequency is a [Hz] and the time is T [sec]. Meanwhile, a vertical position Y is represented by the following equation 2, where the vertical frequency is b [Hz], the time is T [sec], and the phase with respect to X is $\phi$.

$$X = \sin(2\pi \cdot a \cdot T) \qquad \text{Equation 1}$$

$$Y = \sin(2\pi \cdot b \cdot T + \phi) \qquad \text{Equation 2}$$

Here, for example, in a case of scanning one frame while T varies from 0 to 1, scanning trajectories are represented as FIG. 3(a) in which all the trajectories do not overlap with each other, where a=51, b=10 and $\phi$=0.

However, the resonance frequency of a MEMS mirror and so forth may vary due to conditions such as temperature and secular change. For example, if the value of "a" varies from 51 to 52, each two scanning trajectories overlaps to trace the same trajectory, so that a distance between each trajectories in the vertical direction broadens as shown in FIG. 3(b). In addition, when the phase $\phi$ varies from 0 to $\frac{1}{4}\pi$ [rad], drawing trajectories are represented such that distances between drawing trajectories are uneven as shown in FIG. 3(c), even under the condition of a=51 and b=10.

Therefore, as disclosed, for example, in Patent Literature 1 (claim 5 and paragraph 0021), a configuration is possible that has a scanning line detecting means and a control means. With respect to two at least neighboring scanning lines among a plurality of scanning lines, the scanning line detecting means can detect the distance between them in the sub-scanning direction (vertical direction) and the direction of main scanning (horizontal scanning), and the control means controls the phase of the angle of deflection of a deflector (MEMS mirror) such that the distance between two at least neighboring scanning lines detected by the scanning line detecting means is fixed in the sub-scanning direction, and the directions of the main scanning are opposite one another.

CITATION LIST

Patent Literature

PLT1: Japanese Patent Application Laid-Open Publication No. 2008-216299

SUMMARY OF INVENTION

Technical Problem

With this configuration, it is certainly possible to fix the distance between neighboring scanning lines and precisely control Lissajous scanning, and therefore improve the quality of an image formed on a scanning surface. Incidentally, in order to realize a deflector such as a MEMS mirror with high operationality and low power consumption, it is necessary to drive the deflector at its resonance frequency (natural frequency). Therefore, with the configuration disclosed in the above-mentioned patent document, the drive frequencies of the deflector in the main scanning direction and the sub-scanning direction are controlled to vary from the original resonance frequency, and therefore power consumption required to drive the deflector is likely to increase. Moreover, when the drive frequency is greater than the resonance frequency, the driving amplitude (deflection angle) of a deflector may decrease, and, if so, drive control itself is likely to be difficult.

In view of the above described problems, it is therefore an object of the present invention is to provide a two-dimensional light scanning apparatus that can solve the problems.

Solution to Problem

The two-dimensional light scanning apparatus recited in claim 1 configured to deflect light from a light source and repeatedly scan the light in a predetermined pattern includes: a deflector configured to drive at a resonance frequency in a main scanning direction and a sub-scanning direction different from the main scanning direction; a deflector drive control part configured to control driving of the deflector; a position sensor configured to detect a scanning position of the deflector; and a resonance frequency predicting part configured to predict the resonance frequency of the deflector, based on position information obtained from the position sensor. The deflector drive control part is further configured to: for drawing a Lissajous figure in which scanning trajectories of the deflector do not overlap with each other for one frame, store a plurality of pairs of respective frequency ratios of driving signals in the sub-scanning direction to driving signals in the main scanning direction, and respective phases of the driving signals in the sub-scanning direction with respect to the driving signals in the main scanning direction; select one pair of a frequency ratio and a phase from among the pairs of the respective frequency ratios and the respective phases, based on the resonance frequency predicted by the resonance frequency predicting part; and control the deflector with a driving signal based on the selected pair of the frequency ratio and the phase.

BRIEF DESCRIPTION OF THE DRAWINGS

FIG. 2 is a table showing examples of frequencies and periodicities used in the two-dimensional light scanning apparatus according to one embodiment of the present invention.

DESCRIPTION OF EMBODIMENTS

Figure 1:
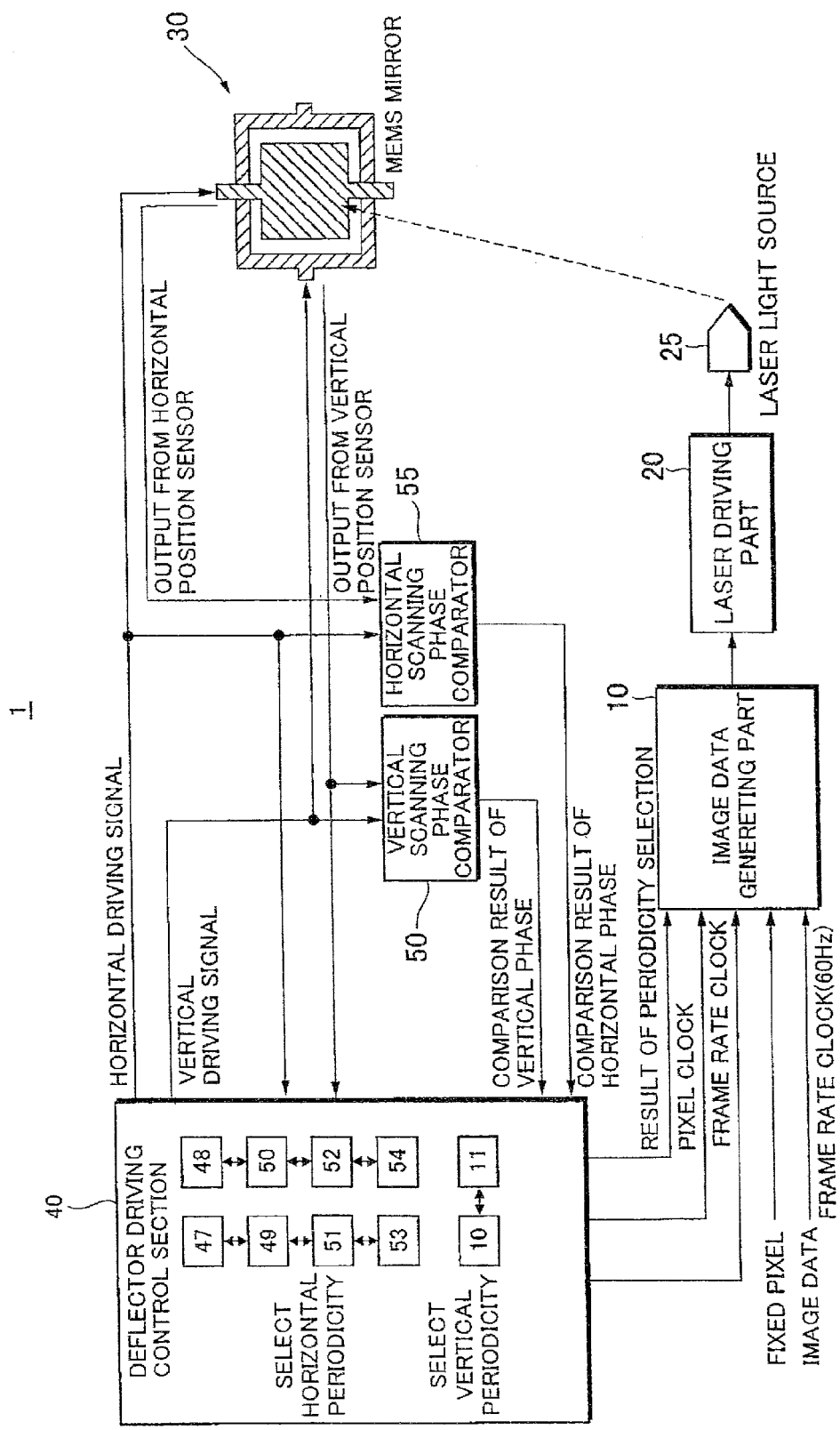
FIG. 1 is a block diagram showing the configuration of a two-dimensional light scanning apparatus according to one embodiment of the present invention.
Figure 3:
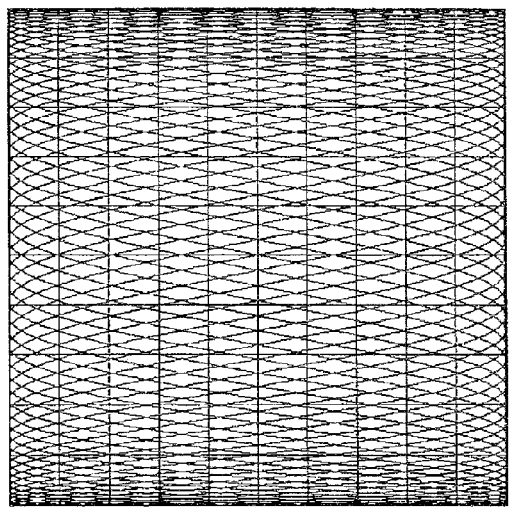
FIGS. 3(a), (b) and (c) are schematic views showing examples of Lissajous scanning.
Figure 3:
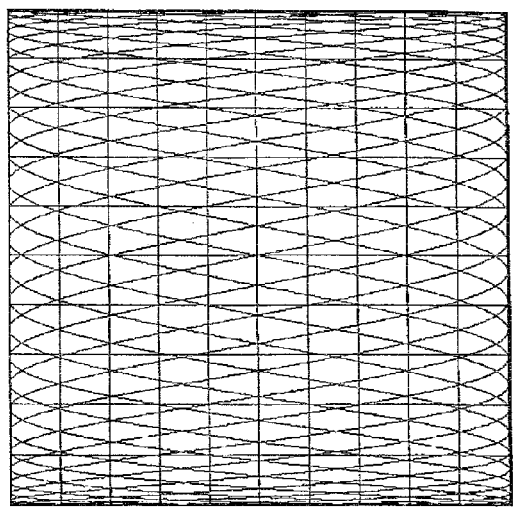
Figure 3:
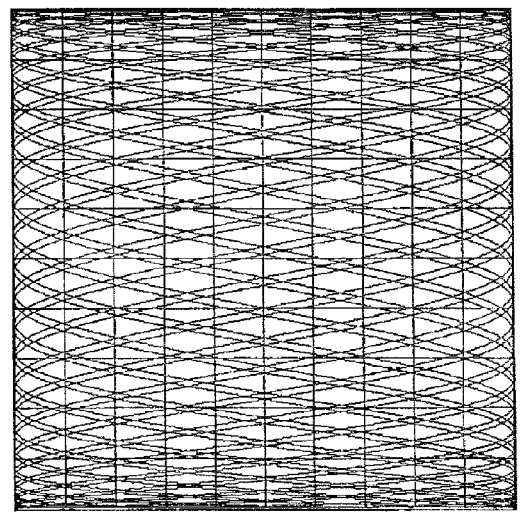

Now, an embodiment of the present invention will be described in detail with reference to the drawings.

For the sake of convenience, components having the same operational effect are assigned the same reference numerals, and overlapping descriptions will be omitted. The present invention is broadly applicable to two-dimensional light scanning apparatuses having a deflector that drives with sine wave oscillation at its resonance frequency in at least one of the main scanning direction and the sub-scanning direction. Here, a case will be described as an example where the present invention is applied to a two-dimensional light scanning apparatus, as an image drawing apparatus including a MEMS mirror that drives at its resonance frequency in the main scanning direction and the sub-scanning direction.

The two-dimensional light scanning apparatus according to the present embodiment is controlled, for scanning (drawing) one frame, to prevent scanning trajectories from overlapping and to prevent distances between scanning trajectories from being uneven. Now, a two-dimensional light scanning apparatus having a MEMS mirror that performs Lissajous scanning, will be explained. Here, as an example, resonance frequency ωx in the horizontal direction is set to 3060 Hz, resonance frequency ωy in the vertical direction is set to 600 Hz, and the frame rate is set to 600 fps, for Lissajous scanning of the MEMS mirror in the normal condition. Here, in this case, the number of times the MEMS mirror oscillates for scanning one frame in the horizontal direction (horizontal periodicity) is 51 (3060 Hz/60 fps), and the number of times the MEMS mirror oscillates for scanning one frame in the vertical direction (vertical periodicity) is 10 (600 Hz/60 fps) (hereinafter, the relationship between them is represented as "51:10"). Here, horizontal position $X_{out}$ scanned by the two-dimensional light scanning apparatus is represented by the following equation 3 where a is the horizontal periodicity, n [fps] is the frame rate, T [sec] is the time and $\phi x$ is the phase at the time of start of drawing one frame (hereinafter referred to as "frame start phase." Meanwhile, vertical position $Y_{out}$ scanned by the two-dimensional light scanning apparatus is represented by the following equation 4 where b is the vertical periodicity, n [fps] is the frame rate, T [sec] is the time, and $\phi y$ is the frame start phase.

$$X_{out}=\sin(2\pi \cdot a \cdot n \cdot T+\phi x) \qquad \text{Equation 3}$$

$$Y_{out}=\sin(2\pi \cdot b \cdot n \cdot T+\phi y) \qquad \text{Equation 4}$$

In this way, in the Lissajous scanning represented as the equations 3 and 4, the scanning trajectories for one frame (in the period of times T=0 to 1/n) overlap under the following conditions 1 to 5.

(Condition 1)
Both the frame start phases $\phi x$ and $\phi y$ are 0 or $\pi$(rad) ($\phi x=\phi y=0, \pi$), and the horizontal periodicity a and the vertical periodicity b have a common divisor.

(Condition 2)
Both the frame start phases $\phi x$ and $\phi y$ are 0 or $\pi$(rad) ($\phi x=\phi y=0, \pi$), and both the horizontal periodicity a and vertical periodicity b are odd numbers.

(Condition 3)
The frame start phase $\phi x$ is 0 or $\pi$(rad) and the horizontal periodicity a is an odd number, and the frame start phase $\phi y$ is $\pi/2$ (rad) or $-\pi/2$ (rad) and the vertical periodicity b is an even number.

(Condition 4)
The frame start phase $\phi x$ is $\pi/2$ (rad) or $-\pi/2$ (rad) and the horizontal periodicity a is an even number, meanwhile the frame start phase $\phi y$ is 0 or $\pi$(rad) and the vertical periodicity b is an odd number.

(Condition 5)
Both the frame start phases $\phi x$ and $\phi y$ are $\pi/2$ (rad) or $-\pi/2$ (rad), ($\phi x=\phi y=\pi/2$ (rad), $-\pi/2$ (rad)), and both the horizontal periodicity a and the vertical periodicity b are even numbers.

Under the conditions 1 to 5, there may be a point where both the horizontal position X (equation 3) and the vertical position Y (equation 4) have no gradient or the maximum gradient in the scanning trajectories for one frame. That is, when the derivatives (derivative values) of the equation 3 and the equation 4 are represented by equation 5 and equation 6, respectively, the scanning trajectories for one frame overlap if there is a variable t (0<t<1/n) that satisfies equation 7 or 8. Here, with the equation 5 and the equation 6, the amplitude is standardized to pay attention to the phases of the derivatives.

$$X'=\cos(2\pi \cdot a \cdot n \cdot T) \qquad \text{Equation 5}$$

$$Y'=\cos(2\pi \cdot b \cdot n \cdot T) \qquad \text{Equation 6}$$

$$X'(t)=Y'(t)=0 \qquad \text{Equation 7}$$

$$X'(t)=Y'(t)=1 \qquad \text{Equation 8}$$

With the present embodiment, a plurality of combinations of horizontal periodicity a, vertical periodicity b, phase $\phi x$ and phase $\phi y$, which are not the values corresponding to the above-described conditions 1 to 5, are prepared in advance. Note that only the conditions 1 and 2 will be discussed here, using a precondition that the frame stat phase satisfies $\phi x=\phi y=0$. Now, a two-dimensional light scanning apparatus will be explained using specific examples.

FIG. 1 is a block diagram showing a two-dimensional light scanning apparatus 1 according to the present embodiment. In the two-dimensional light scanning apparatus 1, pixel data generated by a pixel data generating part 10 is inputted to a laser driving part 20, and a MEMS mirror 30, which is a deflector serving as a scanning part, is irradiated with laser light from a laser light source 25 such as an LD (laser diode). A deflector drive control part 40 controls the MEMS mirror 30 to drive with sine wave oscillation at its resonance frequency with respect to drive axes provided in the horizontal direction which is the main scanning direction, and the vertical direction which is the sub-scanning direction orthogonal to the horizontal direction. Here, the two-dimensional light scanning apparatus 1 is provided with a horizontal position sensor that detects the position of the MEMS mirror 30 in the horizontal direction, and a vertical position sensor that detects the position of the MEMS mirror 30 in the vertical direction. Output from these position sensors are fed back to the deflector drive control part 40. Here, the horizontal position sensor and the vertical position sensor are provided on, for example, the drive axes of the MEMS mirror 30.

In addition, the output (horizontal position $X_{out}$) of the horizontal sensor and the output (vertical position $Y_{out}$) of the vertical sensor, which are provided in the MEMS mirror 30, are inputted to a horizontal scanning phase comparator 50 and a vertical scanning phase comparator 55, respectively. Then, these horizontal scanning phase comparator 50 and vertical scanning phase comparator 55 further receive from the deflector drive control part 40, as input, a horizontal driving signal $X_{in}$ and a vertical driving signal $Y_{in}$ to drive the MEMS mirror 30. The phase shift of the horizontal driving signal $X_{in}$ from the horizontal position $X_{out}$ and the phase shift of the vertical driving signal $Y_{in}$ from the vertical position $Y_{out}$, are inputted to the deflector drive control part 40.

Here, in order to drive the MEMS mirror 30 according to the above-described equations 3 and 4, both the horizontal position $X_{out}$ and the vertical position $Y_{out}$ need to be zero at the start and the end of scanning for one frame because a condition $X_{out}=Y_{out}=0$ is satisfied at T=0. However, with the MEMS mirror 30, the phase relationship with a frequency response, such as a second-order lag element, is held between $X_{in}$ and $X_{out}$ and between $Y_{in}$ and $Y_{out}$, and therefore, when the equation 3 and the equation 4 are applied to the horizontal driving signal $X_{in}$ and the vertical driving signal $Y_{in}$ to be inputted to the MEMS mirror 30, phase shift is likely to occur between $X_{out}$ and $Y_{out}$. Therefore, the horizontal driving signal $X_{in}$ and the vertical driving signal $Y_{in}$ inputted to the MEMS mirror 30 are represented by the following equations 9 and 10.

$$\text{Horizontal driving signal } X_{in}=\sin(2\pi \cdot a \cdot n \cdot T) \quad \text{Equation 9}$$

$$\text{Vertical driving signal } Y_{in}=\sin(2\pi \cdot b \cdot n \cdot T + \phi) \quad \text{Equation 10}$$

Then, the deflector drive control part 40 monitors the output (horizontal position $X_{out}$) of the horizontal position sensor and the output (vertical position $Y_{out}$) of the vertical position sensor at the start point of one frame, T=0, and generates the horizontal driving signal $X_{in}$ and the vertical driving signal $Y_{in}$, adjusting the phase ϕ of the vertical driving signal $Y_{in}$ with respect to the horizontal driving signal $X_{in}$ to make $X_{out}=Y_{out}=0$.

The MEMS mirror 30 is designed such that the resonance frequency in the horizontal direction ωx is 3060 Hz and the resonance frequency in the vertical direction ωy is 600 Hz, respectively, in the normal condition. These resonance frequencies, however, are expected to vary due to such as temperature. Therefore, the deflector drive control part 40 is provided with a resonance frequency predicting part to predict the resonance frequencies at the time of activation and after activation. At the time the MEMS mirror 30 activates, a driving signal is outputted to the MEMS mirror at a constant current, changing the frequency of the driving signal little by little within a range over which the frequency is expected to vary, for example, around 3,000 Hz in the horizontal direction and around 600 Hz in the vertical direction. At this time, the horizontal position sensor and the vertical position sensor monitor the deflection angle of the MEMS mirror 30 to find the frequencies to provide the maximum deflection angle, and those are stored as the resonance frequency ωx and the resonance frequency ωy at the time of the activation.

After the activation, the horizontal sensor and the vertical sensor consistently measure the amplitude of the MEMS mirror 30. Then, utilizing a property of the MEMS mirror 30 that the amplitude reduces when the difference between the drive frequency and the resonance frequency is greater, the deflector drive control part 40 estimates the current difference between the drive frequency and the resonance frequency based on the measured amplitude of the MEMS mirror 30. Moreover, the horizontal scanning phase comparator 50 consistently compares the phases between the horizontal driving signal $X_{in}$ and the horizontal position $X_{out}$, meanwhile the vertical scanning phase comparator 55 consistently compares the phases between the vertical driving signal $Y_{in}$ and the vertical position $Y_{out}$. Here, under the condition that the drive frequency is fixed, when the resonance frequency is higher, a phase advance occurs, and, on the other hand, when the resonance frequency is lower, a phase delay occurs. Therefore, the deflector drive control part 40 can determine whether the actual resonance frequency is higher or lower than the current drive frequency, based on the output from the horizontal scanning phase comparator 50 and the vertical scanning phase comparator 55. With this configuration, even when the resonance frequency of the MEMS mirror 30 varies due to a change in conditions such as temperature, the deflector drive control part 40 (resonance frequency predicting means) can find the resonance frequency after the change.

The deflector drive control part 40 according to the present embodiment stores in advance a frequency table (see FIG. 2). Here, since the precondition that the frame start phase satisfies ϕx=ϕy=0 is used, the frequency table consists of pairs of "horizontal periodicity a: vertical periodicity b" not corresponding to the above-described conditions 1 and 2, which are "47:10", "49:10", "51:10", "53:10", "48:11", "50:11", "52:11" and "54:11", and the corresponding pairs of "horizontal drive frequency: vertical drive frequency", which are "2820:600", "2940:600", "3060:600", "3180:600", "2880:600", "3000:660", "3120:660" and "3240:660". Here, the values obtained by multiplying horizontal periodicity a and vertical periodicity b by frame rate n are the horizontal drive frequency and the vertical drive frequency, respectively, and therefore, "horizontal periodicity a: vertical periodicity b" can be the ratio (frequency ratio) between a horizontal drive frequency and a vertical drive frequency.

Then, the deflector drive control part 40 selects the pair of "horizontal drive frequency: vertical drive frequency" which is the most similar to the found resonance frequency ωx and the resonance frequency ωy, and outputs the corresponding pair of "horizontal periodicity a: vertical periodicity b", as the result of the periodicity selection, to the pixel data generating part 10. Here, the deflector drive control part 40 also outputs the pixel clock and the frame rate clock in synchronization with the horizontal driving signal $X_{in}$ and the vertical driving signal $Y_{in}$, to the pixel data generating part 10.

Next, drive control with the two-dimensional light scanning apparatus 1 will be described. At the time of activation, resonance frequencies are searched, and, for example, resonance frequency ωx=3050 Hz and resonance frequency ωy=610 Hz may be stored. The deflector drive control part 40 first selects, from the frequency table, "600 Hz" which is minimally different from the stored resonance frequency ωy (610 Hz), as vertical frequency $Y_{out}$, and next, selects "3060 Hz" which is minimally different from the stored resonance frequency ωx (3050 Hz), from among the values pairing with the vertical frequency "600 Hz", as horizontal frequency $X_{out}$. Then, at T=0, which is the start point of scanning for one frame, the phase ϕ in the equation 10 is adjusted to make $X_{out}=Y_{out}=0$, so that horizontal driving signal $X_{in}$ and vertical driving signal $Y_{in}$ are generated. In addition, the deflector drive control part 40 sends the result of periodicity selection, "51:10", to the pixel data generating part 10. The pixel data generating part 10 computes the scanning trajectory of the MEMS mirror 30, based on the result of the periodicity selection, the pixel clock and the frame rate clock which are inputted from the deflector drive control part 40, and generates pixel data corresponding to the scanning trajectory when the periodicity is "51:10", based on the computed scanning trajectory of the MEMS mirror 30 and the pixel data of the fixed pixel in synchronization with the frame rate clock of 60 Hz inputted from the outside.

After activation, the deflector drive control part 40 may detect (store) the resonance frequency increasing, that detect the resonance frequency ωx=3150 Hz and the resonance frequency ωy=620 Hz. Then, the deflector drive control part 40 first selects, from the frequency table, "600 Hz" which is minimally different from the stored resonance frequency ωy (620 Hz), as vertical frequency $Y_{out}$, and also selects "3180 Hz" which is minimally different from the stored resonance frequency ωx (3150 Hz), from among the values pairing with the vertical frequency "600 Hz", as horizontal frequency $X_{out}$. Then, at T=0, which is the start point of scanning for one frame, the phase ϕ in the equation 10 is adjusted to make $X_{out}=Y_{out}=0$, so that horizontal driving signal $X_{in}$ and vertical driving signal $Y_{in}$ are generated. Moreover, the deflector drive control part 40 sends the result of the periodicity selection, "53:10", to the pixel data generating part 10, and the pixel data generating part 10 generates pixel data corresponding to the scanning trajectory when the frequency ratio is 53:10. At this time, the number of scanning lines is 53/51 times as many as that when the frequency ratio is 51:10 at the time of the activation.

Then, the resonance frequency further changes from the above-mentioned example, and the deflector drive control part 40 detects (stores) the resonance frequency $\omega x=3200$ Hz, and the resonance frequency $\omega y=650$ Hz. The deflector drive control part 40 first selects, from the frequency table, "660 Hz" which is minimally different from the stored resonance frequency $\omega y$ (650 Hz), as vertical frequency $Y_{out}$, and next, selects "3240 Hz" which is minimally different from the stored resonance frequency $\omega x$ (3200 Hz), from among the values pairing with the vertical frequency "660 Hz", as horizontal frequency $X_{out}$. Then, at T=0, which is the start point of scanning for one frame, the phase (pin the equation 10 is adjusted to make $X_{out}=Y_{out}=0$, so that horizontal driving signal $X_{in}$ and vertical driving signal $Y_{in}$ are generated. In addition, the deflector drive control part 40 sends the result of periodicity selection, "54:11", to the pixel data generating part 10, and the pixel data generating part 10 generates pixel data corresponding to the scanning trajectory when the frequency ratio is 54:11. In this way, even if the resonance frequency changes due to a change in conditions such as temperature, the MEMS mirror 30 consistently drives at the drive frequency similar to the resonance frequency after the change, and therefore it is possible to provide a large deflection angle while reducing power consumption.

Here, as the present embodiment, when drawing is performed with Lissajous scanning, a drawing trajectory in the horizontal direction fluctuates in a sine wave pattern as represented by the equation 3. Therefore, the scanning speed Vx is maximum at the center of the screen in the horizontal direction and minimum in the end sides, and the brightness of the screen is high in the end sides and low at the center of the screen. Therefore, with the present embodiment, brightness correction is performed on pixel data in proportion to the inverse of the scanning speed to avoid the difference in brightness between the center and the end sides of the screen in the horizontal direction. Then, a drawing trajectory in the vertical direction also fluctuates in a sine wave pattern, and therefore it is necessary to perform brightness correction as well because the brightness of the screen is high in the end sides and low at the center of the screen in the vertical direction.

Although the embodiment of the present invention has been described in detail with reference to the drawings, specific configurations are not limited to this, but the present invention may include a design change without departing from the spirit of the present invention. For example, specific frequencies and periodicities are not limited to the embodiment, but may be changed appropriately.

In addition, although only the conditions 1 and 2 have been discussed as examples using the precondition that the frame start phase satisfies $\phi x=\phi y=0$, the present invention is not limited to this, but it is possible to apply a plurality of conditions among the conditions 1 to 5 at the same time, without the precondition that the frame start phase satisfies $\phi x=\phi y=0$. In this case, it is necessary to control phases as well as frequencies by adding the conditions for $\phi x$ and $\phi y$, to the frequency table. For example, as the condition 5, when $\phi x=\pi/2$(rad) and $\phi y=\pi/2$(rad) are selected, the phase is controlled to make $X_{out}=Y_{out}=-1$ at the time of T=0.

Moreover, a configuration has been explained as an example where the amplitude of the MEMS mirror is consistently monitored after activation, and the frequency after the change is searched based on this amplitude and the signals from the horizontal scanning phase comparator and the vertical scanning phase comparator, but the present invention is not limited to this. For example, another configuration is possible where the amplitude of the MEMS mirror is measured, changing the drive frequency every certain period of time to find the resonance frequency.

Reference Signs List

1 two-dimensional light scanning apparatus
10 pixel data generating part
20 laser driving part
30 MEMS mirror
40 deflector drive control part
50 horizontal scanning phase comparator
55 vertical scanning phase comparator

The invention claimed is:

1. A two-dimensional light scanning apparatus configured to deflect light from a light source and repeatedly scan the light in a predetermined pattern, the apparatus comprising:
    a deflector configured to drive at a resonance frequency in a main scanning direction and a sub-scanning direction different from the main scanning direction;
    a position sensor configured to detect a scanning position of the deflector;
    a resonance frequency predicting part configured to predict the resonance frequency of the deflector, based on position information obtained from the position sensor; and
    a deflector drive control part configured to:
    for drawing a Lissajous figure in which scanning trajectories of the deflector do not overlap with each other for one frame, store a plurality of pairs of respective frequency ratios of driving signals in the sub-scanning direction to driving signals in the main scanning direction, and respective phases of the driving signals in the sub-scanning direction with respect to the driving signals in the main scanning direction;
    select one pair of a frequency ratio and a phase from among the pairs of the respective frequency ratios and the respective phases, based on the resonance frequency predicted by the resonance frequency predicting part; and
    control the deflector with a driving signal based on the selected pair of the frequency ratio and the phase.

2. The two-dimensional light scanning apparatus according to claim 1, wherein:
    the deflector drives in the main scanning direction which is a horizontal direction and in the sub-scanning direction which is a vertical direction; and
    the deflector drive control part selects a frequency in the horizontal direction and a frequency and a phase in the vertical direction, as the pair of the frequency ratio and the phase, and
    the two-dimensional light scanning apparatus further comprising an image data generating part configured to compute a drawing trajectory based on the frequency in the horizontal direction and the frequency and the phase in the vertical direction, which are selected by the deflector drive control part, and generate image data according to the drawing trajectory.

3. The two-dimensional light scanning apparatus according to claim 1, wherein the resonance frequency predicting part predicts the resonance frequency of the deflector, based on the position information obtained from the position sensor and the driving signal outputted from the deflector drive control part.

4. The two-dimensional light scanning apparatus according to claim 1, wherein:
   the deflector drives in the main scanning direction which is a horizontal direction and in the sub-scanning direction which is a vertical direction; and
   the deflector drive control part stores the pair of the frequency ratio and the phase to make no point in one frame where respective gradients of the driving signals in the main scanning direction and the sub-scanning direction are zero, and also make no point where respective gradients of the driving signals in the main scanning direction and the sub-scanning direction are maximum.

* * * * *